J. G. HENZEL.
BAIT HOOK.
APPLICATION FILED FEB. 24, 1914.

1,155,923.

Patented Oct. 5, 1915.

J. G. Henzel
Inventor,

Witnesses
F. B. Wooden.
M. C. Lucas.

by
Attorneys.

UNITED STATES PATENT OFFICE.

JOHN G. HENZEL, OF CHICAGO, ILLINOIS.

BAIT-HOOK.

1,155,923.

Specification of Letters Patent.

Patented Oct. 5, 1915.

Application filed February 24, 1914. Serial No. 820,595.

*To all whom it may concern:*

Be it known that I, JOHN G. HENZEL, a citizen of the United States, residing at Chicago, in the county of Cook and State of Illinois, have invented certain new and useful Improvements in Bait-Hooks, of which the following is a specification.

This invention relates to improvements in fish-hooks, and its object is to provide a novel and improved means for securing the bait to the hook, whereby its loss is effectually prevented; and, furthermore, to provide a structure which enables the bait to be mounted on the hook in such a manner that the fish is permitted to take the hook very readily.

Figure 1:
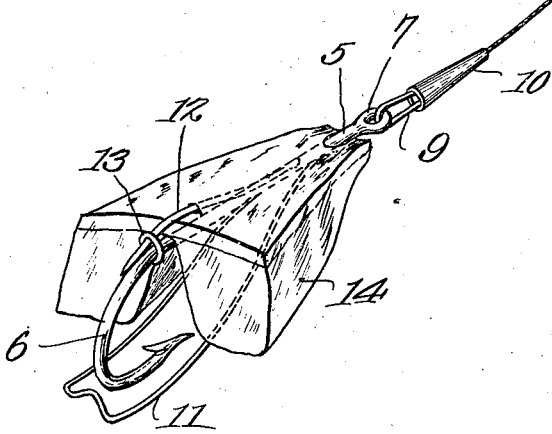
Figure 2:
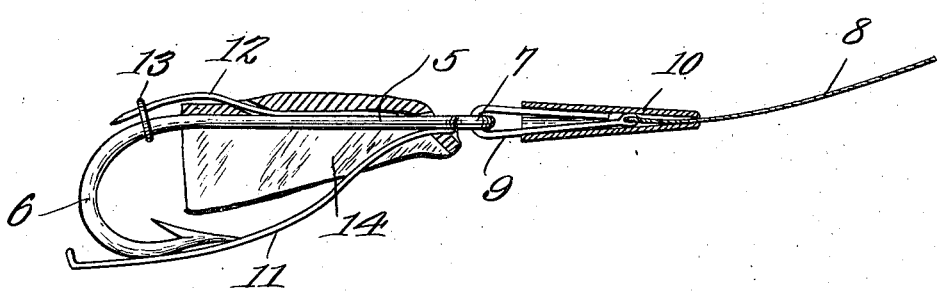

In the accompanying drawing forming a part of this specification, Figure 1 is a perspective view of the hook showing the same baited, and Fig. 2 is a longitudinal section through the bait.

Referring specifically to the drawing 5 denotes the shank of a fish-hook 6, said shank having a terminal eye 7 for attachment of the line 8, the latter carrying a hook 9 at its end which is passed through the eye. A sleeve 10 is slidable over the hook to serve as a guard for the same. To the shank 5 is secured a weed-guard 11 in the shape of a looped wire which is positioned below the hook 6. To the shank 5 is also secured a bait-holder comprising a piece of wire which is fastened to the shank and has an outward bend at one end terminating in a pin portion 12 extending along the back of the shank, in spaced relation therewith and in the direction of the hook 6. The shank also carries a small ring 13 forming a guard for holding the pin 12.

In use, the piece of bait 14 is split longitudinally on one side to nearly the upper end thereof, and the hook 6 is passed through said end in such a manner that its shank 5 lies in the split, the hook being at the bottom and projecting slightly from the lower end of the bait and pointing toward the top thereof. The pin 12 is passed through the last-mentioned end of the bait and fastened in the guard 13. Thus, it will be seen that the bait is held in two places, and is securely fastened on the hook. While in the water, the position of the bait is horizontal, and the hook is at the bottom. The bait is designed for a surface bait, and when a fish attempts to strike the same, its mouth is unhampered by the bait, and a tug on the line impales the hook 6 in the lower jaw. The upper jaw of the fish aids in this action, as the lower jaw protrudes beyond the same, and when the fish strikes the bait the hook becomes seated in the lower jaw.

I claim:

The combination with a fish hook having a shank, of a pin member having its base portion attached to the back of the shank and a sharpened point portion adapted to penetrate a bait, and a keeper slidable on the shank and engageable over the point of the pin.

In testimony whereof I affix my signature in presence of two witnesses.

JOHN G. HENZEL.

Witnesses:
S. J. LEHRER,
H. G. BATCHELOR.